US006442168B1

(12) United States Patent
Vasa

(10) Patent No.: US 6,442,168 B1
(45) Date of Patent: *Aug. 27, 2002

(54) HIGH SPEED BUS STRUCTURE IN A MULTI-PORT BRIDGE FOR A LOCAL AREA NETWORK

(75) Inventor: Suresh L. Vasa, Cupertino, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/025,356

(22) Filed: Feb. 18, 1998

Related U.S. Application Data

(60) Provisional application No. 60/059,171, filed on Sep. 17, 1997.

(51) Int. Cl.[7] .......................... H04L 12/28; H04L 12/40
(52) U.S. Cl. ....................................... 370/401; 370/438
(58) Field of Search ................................. 370/351, 401, 370/402, 412, 419, 463, 410, 414, 421, 423, 426, 428, 438, 439, 445, 450, 451, 454, 446

(56) References Cited

U.S. PATENT DOCUMENTS

| | | | |
|---|---|---|---|
| 3,735,357 A | 5/1973 | Maholick et al. | 340/172.5 |
| 4,213,201 A | 7/1980 | Gagnier et al. | 370/62 |
| 4,589,120 A | 5/1986 | Mendala | 375/117 |
| 4,597,078 A | 6/1986 | Kempf | 370/94 |
| 4,627,052 A | 12/1986 | Hoare et al. | 370/88 |
| 4,706,081 A | 11/1987 | Hart et al. | 340/825.03 |
| 4,707,827 A | 11/1987 | Bione et al. | 370/85 |
| 4,710,769 A | 12/1987 | Friedman et al. | 340/825.03 |

(List continued on next page.)

FOREIGN PATENT DOCUMENTS

| | | | |
|---|---|---|---|
| EP | 0 397 188 A2 | 11/1990 | H04L/12/46 |
| EP | 0597789 A1 | 5/1994 | H04L/12/46 |
| EP | 0 609 626 A2 | 8/1994 | H04L/12/50 |
| EP | 0 642 246 A2 | 3/1995 | H04L/29/06 |
| EP | 0785698 A2 | 7/1997 | H04Q/11/04 |
| WO | WO 96/13922 | 5/1996 | H04L/12/44 |
| WO | WO 96/21302 | 7/1996 | H04L/12/46 |
| WO | WO 97/18657 | 5/1997 | H04L/12/18 |

OTHER PUBLICATIONS

Hemant Kanakia and David R. Cheriton, "The VMP Network Adapter Board (NAB): High–Performance Network Communication for Multiprocessors," Computer Communications Review, vol. 18, No. 4, pp. 175–187, 1988.

(List continued on next page.)

Primary Examiner—Chau Nguyen
Assistant Examiner—Andy Lee
(74) Attorney, Agent, or Firm—Haverstock & Owens LLP

(57) ABSTRACT

A high speed bus structure for a multi-port bridge for controlling the flow of data packets through the multi-port bridge by using a limited number of bus commands. The bridge includes a memory for storing packets and a plurality of ports. Each port includes a receive buffer, a transmit buffer and a memory pointer buffer. A data packet is received by the receive buffer of a port. As the packet is still being received, a look-up table is utilized to determine which is the appropriate destination port for the packet. The destination ports are notified of their status as destination ports by raising a signal line of the communication bus corresponding to each destination port, referred to as a "bit-map." If the memory pointer buffer in the destination port is nearly full, the destination port generates a jam request. The source port receives the jam request and, in response, discards the incoming packet and sends a jam signal. If the destination port is available to receive the packet directly from the source port, the destination port receives the packet simultaneously as the packet is stored in the memory device. Once the packet is stored, a memory pointer is placed on the communication bus. The memory pointer is stored in the destination port until the packet can be retrieved from the memory for transmission by the destination port.

48 Claims, 8 Drawing Sheets

U.S. PATENT DOCUMENTS

| | | | |
|---|---|---|---|
| 4,715,030 A | 12/1987 | Koch et al. | 370/85 |
| 4,718,060 A | 1/1988 | Oguchi et al. | 370/85 |
| 4,723,311 A | 2/1988 | Moustakas et al. | 455/612 |
| 4,727,537 A | 2/1988 | Nichols | 370/85 |
| 4,727,538 A | 2/1988 | Furchtgott et al. | 370/85 |
| 4,737,953 A | 4/1988 | Koch et al. | 370/94 |
| 4,744,078 A | 5/1988 | Kowalczyk | 370/85 |
| 4,797,879 A | 1/1989 | Habbab et al. | 370/3 |
| H586 H | 2/1989 | Kun | 370/94 |
| 4,823,338 A | 4/1989 | Chan et al. | 370/85 |
| 4,849,962 A | 7/1989 | Morimoto et al. | 370/29 |
| 4,878,216 A | 10/1989 | Yunoki | 370/60 |
| 4,901,308 A | 2/1990 | Deschaine | 370/58.1 |
| 4,905,219 A | 2/1990 | Barr et al. | 370/4 |
| 4,933,937 A | 6/1990 | Konishi | 370/85.13 |
| 4,935,922 A | 6/1990 | Wicklund et al. | 370/60 |
| RE33,426 E | 11/1990 | Sugimoto et al. | 370/85.14 |
| 5,016,159 A | 5/1991 | Maruyama | 364/200 |
| 5,020,052 A | 5/1991 | DePrycker et al. | 370/60 |
| 5,027,350 A | 6/1991 | Marshall | 370/85.13 |
| 5,048,014 A | 9/1991 | Fischer | 370/85.5 |
| 5,107,489 A | 4/1992 | Brown et al. | 370/58.2 |
| 5,119,367 A | 6/1992 | Kawakatsu et al. | 370/54 |
| 5,140,585 A | 8/1992 | Tomikawa | 370/60.1 |
| 5,151,897 A | 9/1992 | Suzuki | 370/85.13 |
| 5,151,994 A | 9/1992 | Wille et al. | 395/800 |
| 5,166,926 A | 11/1992 | Cisneros et al. | 370/60 |
| 5,184,346 A | 2/1993 | Kozaki et al. | 370/60 |
| 5,229,993 A | 7/1993 | Foudriat et al. | 370/85.3 |
| 5,241,550 A | 8/1993 | Kusano | 371/71 |
| 5,243,699 A | 9/1993 | Nickolls et al. | 395/275 |
| 5,274,631 A * | 12/1993 | Bhardwaj | 370/401 |
| 5,276,681 A * | 1/1994 | Tobagi et al. | 370/401 |
| 5,307,345 A | 4/1994 | Lozowick et al. | 370/61 |
| 5,339,316 A | 8/1994 | Diepstraten | 370/85.13 |
| 5,353,353 A | 10/1994 | Vijeh et al. | 380/29 |
| 5,379,289 A | 1/1995 | DeSouza et al. | 70/85.13 |
| 5,379,296 A | 1/1995 | Johnson et al. | 370/60 |
| 5,386,413 A | 1/1995 | McAuley et al. | 370/54 |
| 5,410,754 A | 4/1995 | Klotzbach et al. | 370/85.13 |
| 5,430,762 A | 7/1995 | Vijeh et al. | 375/211 |
| 5,432,907 A * | 7/1995 | Picazo, Jr. et al. | 709/249 |
| 5,434,861 A | 7/1995 | Pritty et al. | 370/85.8 |
| 5,446,726 A | 8/1995 | Rostoker et al. | 370/17 |
| 5,448,565 A | 9/1995 | Chang et al. | 370/85.13 |
| 5,457,446 A | 10/1995 | Yamamoto | 340/825.24 |
| 5,457,679 A | 10/1995 | Eng et al. | 370/16 |
| 5,481,540 A | 1/1996 | Huang | 370/85.13 |
| 5,487,067 A | 1/1996 | Matsushige | 370/85.7 |
| 5,502,748 A | 3/1996 | Wilkinson | 375/354 |
| 5,506,902 A | 4/1996 | Kubota | 380/9 |
| 5,515,376 A * | 5/1996 | Murthy et al. | 370/402 |
| 5,515,513 A | 5/1996 | Metzger et al. | 395/200.15 |
| 5,517,494 A | 5/1996 | Green | 370/60 |
| 5,521,913 A | 5/1996 | Gridley | 370/58.2 |
| 5,522,059 A | 5/1996 | Marushima et al. | 395/476 |
| 5,530,434 A | 6/1996 | Kanda | 340/825.04 |
| 5,541,923 A | 7/1996 | Kato | 370/85.1 |
| 5,546,385 A * | 8/1996 | Caspi et al. | 370/412 |
| 5,550,826 A | 8/1996 | Tanaka et al. | 370/85.8 |
| 5,559,796 A | 9/1996 | Edem et al. | 370/60 |
| 5,560,038 A | 9/1996 | Haddock | 395/800 |
| 5,568,476 A | 10/1996 | Sherer et al. | 370/60 |
| 5,598,278 A | 1/1997 | Tanaka et al. | 386/96 |
| 5,598,391 A | 1/1997 | Mukawa | 369/54 |
| 5,598,581 A | 1/1997 | Daines et al. | 395/872 |
| 5,608,730 A | 3/1997 | Osakabe et al. | 370/471 |
| 5,608,879 A | 3/1997 | Cooke | 395/290 |
| 5,617,421 A | 4/1997 | Chin et al. | 370/402 |
| 5,640,399 A | 6/1997 | Rostoker et al. | 370/392 |
| 5,644,571 A * | 7/1997 | Seaman | 370/401 |
| 5,680,622 A | 10/1997 | Even | 395/709 |
| 5,721,927 A | 2/1998 | Baraz et al. | 395/705 |
| 5,764,895 A | 6/1998 | Chung | 395/700.8 |
| 5,802,047 A | 9/1998 | Kinoshita | 370/359 |
| 5,805,816 A | 9/1998 | Picazo, Jr. et al. | 395/200.53 |
| 5,844,903 A | 12/1998 | Terashita et al. | 370/403 |
| 5,852,607 A | 12/1998 | Chin | 370/401 |
| 5,857,075 A | 1/1999 | Chung | 395/200.53 |
| 5,859,837 A | 1/1999 | Crayford | 370/230 |
| 5,878,028 A | 3/1999 | Roy et al. | 370/235 |
| 5,884,040 A * | 3/1999 | Chung | 370/401 |
| 5,917,821 A | 6/1999 | Gobuyan et al. | 370/392 |
| 5,923,654 A | 7/1999 | Schnell | 370/390 |
| 5,923,660 A | 7/1999 | Shemla et al. | 370/402 |
| 5,926,473 A | 7/1999 | Gridley | 370/389 |
| 5,926,626 A * | 7/1999 | Takeuchi et al. | 709/249 |
| 5,940,596 A | 8/1999 | Rajan et al. | 395/200.72 |
| 5,940,597 A | 8/1999 | Chung | 395/200.72 |
| 5,949,788 A | 9/1999 | Friedman et al. | 370/431 |
| 5,951,651 A | 9/1999 | Lakshman et al. | 709/239 |
| 5,978,378 A | 11/1999 | Van Seters et al. | 370/401 |
| 5,978,385 A * | 11/1999 | Haddock et al. | 370/446 |
| 5,991,305 A | 11/1999 | Simmons et al. | 370/422 |
| 6,018,526 A | 1/2000 | Liu et al. | 370/401 |
| 6,044,080 A | 3/2000 | Antonov | 370/401 |
| 6,067,300 A | 5/2000 | Baumert et al. | 370/413 |
| 6,070,205 A | 5/2000 | Kato et al. | 710/100 |
| 6,075,773 A | 6/2000 | Clark et al. | 370/241 |
| 6,081,532 A | 6/2000 | Fiammante | 370/401 |
| 6,084,877 A | 7/2000 | Egbert et al. | 370/389 |
| 6,088,356 A | 7/2000 | Hendel et al. | 370/392 |
| 6,091,725 A | 7/2000 | Cheriton et al. | 370/392 |
| 6,094,434 A | 7/2000 | Kotzur et al. | 370/401 |
| 6,098,110 A | 8/2000 | Witkowski et al. | 709/249 |
| 6,108,345 A | 8/2000 | Zhang | 370/445 |
| 6,111,874 A | 8/2000 | Kerstein | 370/389 |
| 6,122,277 A | 9/2000 | Garmire et al. | 370/390 |
| 6,130,891 A | 10/2000 | Lam et al. | 370/401 |
| 6,137,797 A | 10/2000 | Bass et al. | 370/392 |
| 6,157,951 A * | 12/2000 | Vasa | 709/223 |

OTHER PUBLICATIONS

William Stallings, "Internetworking: A Guide for the Perplexed," Telecommunications, North American Edition, Sep. 1989, pp. 25–30.

Bob Stewart and Bill Hawe, "Local Area Network Applications," Telecommunications, North American Edition, Sep. 1984, pp. 96f–96j, and 96u.

Bob Stewart, Bill Hawe, and Alan Kirby, "Local Area Network Connection," Telecommunications, North American Edition, Sep. 1984, pp. 54–55,58–59 and 66.

National Semiconductor, databook, "DP83934 SONIC™–T Systems–Oriented Network Interface Controller with Twisted Pair Interface" pp. 1–457 to 1–458, 1–468 to 1–477, 1–480, 1–512, 1–527 to 1–529.

NEC Data Sheet, MOS Integrated Circuit μPD4516421, 4516821,4516161 16M–bit Synchronous DRAM, Nov. 1995.

Printout of internet website http://www.ti.com/sc/docs/network/tswitch/product.htm#3150al, ThunderSWITCH Product Information, "ThunderSWITCH Product Descriptions," Feb. 1997.

Texas Instruments Products Preview SPWS027, "TNETX3150 ThunderSWITCH™ 15–Port 10–/100–MBIT/S Ethenet™ Switch," pp. 1–85, Sep. 1996.

* cited by examiner

Triplet

| Source Port Identification 500 | Dest. Port Identification 502 | Memory Address 504 |

*Fig. 8*

HIGH SPEED BUS STRUCTURE IN A MULTI-PORT BRIDGE FOR A LOCAL AREA NETWORK

This application claims the benefit of U.S. Provisional Application No. 60/059,171, filed Sep. 17, 1997, entitled, "MULTI-PORT BRIDGE FOR A LOCAL AREA NETWORK."

FIELD OF THE INVENTION

The invention relates to a multi-port bridge for a local area network. More particularly, the invention relates to a high speed bus structure for a multi-port bridge for controlling the flow of data packets through the multi-port bridge by using a limited number of bus commands.

BACKGROUND OF THE INVENTION

Nodes of a local area network (LAN) are typically interconnected by a shared transmission medium. The amount of data traffic that the shared transmission medium can accommodate, however, is limited. For example, only one node at a time can successfully transmit data to another node over the shared transmission medium. If two or more nodes simultaneously attempt to transmit data, a data collision occurs, which tends to corrupt the data being transmitted. Thus, nodes that share a transmission medium are considered to be in a same collision domain.

A multi-port bridge allows simultaneous communication between nodes of the LAN by segmenting the LAN into multiple collision domains (also referred to as network segments), each segment having a corresponding transmission medium. FIG. 1 illustrates a conventional local area network (LAN) including a multi-port bridge 20. The multi-port bridge 20 in this example has eight ports A–H, though the number of ports can vary. Each port A–H is connected to a segment 21–28 of the LAN. Each segment 21–28 typically includes one or more nodes 29–44, such as a workstation, a personal computer, a data terminal, a file server, a printer, a facsimile, a scanner or other conventional digital device. Each of the nodes 29–44 has an associated node address which uniquely identifies the node. The nodes 29–44 are configured to send data, one to another.

When the LAN operates according to Ethernet standards, such as the Institute of Electrical and Electronics Engineers (IEEE) 802.3 standard, data is communicated in the form of discrete packets. FIG. 2 illustrates a conventional IEEE 802.3 data packet 50. The data packet 50 includes an eight byte long pre-amble 51 which is generally utilized for synchronizing a receiver to the data packet 50. The pre-amble includes seven bytes of pre-amble and one byte of start-of-frame. Following the pre-amble 51, the data packet 50 includes a six byte long destination address 52, which is the node address of a node which is an intended recipient for the data packet 50. Next, the data packet 50 includes a six byte long source address 53, which is the node address of a node which originated the data packet 50.

Following the source address 53 is a two-byte length field 54. Following the length field 54 is a data field 55. The data field 55 can be up to 1500 bytes long. Finally, the data packet 50 includes a four-byte frame check field 56 which allows a recipient of the data packet 50 to determine whether an error has occurred during transmission of the data packet 50.

When a node (source node) sends data to another node (destination node) located on its same segment of the LAN (intra-segment communication), the data is communicated directly between the nodes without intervention by the multi-port bridge 20 and is known as an intra-segment packet. Therefore, when the multi-port bridge 20 receives an intra-segment packet, the multi-port bridge 20 does not bridge the packet (the packet is filtered). When a node (source node) sends a data packet to another node (destination node) located on a different segment (inter-segment communication) the multi-port bridge 20 appropriately forwards the data packet to the destination node.

Problems can arise, however, when the capabilities of the multi-port bridge are exceeded by network demand. When data packets are received by the multi-port bridge 20 at a rate that is higher than the rate at which the multi-port bridge 20 can appropriately forward the packets, the network becomes congested. This problem is exacerbated as network users place increasing demands on the network.

Therefore, what is needed is improved technique for controlling the flow of data in a multi-port bridge for a local area network.

SUMMARY OF THE INVENTION

The invention is a method of and apparatus for controlling the flow of data packets in a multi-port bridge. The multi-port bridge includes a switch engine, a memory and a plurality of ports, all of which are interconnected by a high speed communication bus. The switch engine includes a bus controller, a memory controller and a look-up controller, each preferably being a finite state machine. The memory controller provides an interface between the memory and the communication bus. The bus controller controls access to the communication bus by collecting requests and granting the requests according to an appropriate priority. The look-up controller determines to which port each packet is to be directed based upon the destination node address for the packet. The high speed communication bus includes single bit signal lines dedicated to communicating control commands, signal lines dedicated to communicating data, and several signal lines having special purposes. For example, two signal lines are preferably dedicated to initiating access to the bus, each having a respective priority, another signal line is dedicated to jam requests (for applying backpressure), still another signal line is dedicated to the memory controller and yet another signal line is dedicated to providing a bus clock signal. The memory includes look-up tables utilized for appropriately directing data packets among the ports, packet buffers utilized for temporarily storing packets and mailboxes for providing an interface between the switch engine and an external processor.

Each port includes a port controller, a MAC transceiver, a receive finite state machine, a transmit finite state machine, a receive buffer, a transmit buffer and a memory pointer buffer. Packets received from a LAN segment by the transceiver are directed to the communication bus through the receive buffer, while packets to be transmitted over the LAN segment are directed to the transceiver through the transmit buffer. The memory pointer buffer stores memory pointers in a queue for transmission by the port, one memory pointer for each data packet being stored in the packet buffers of the memory.

A data packet originating from a node (source node) in a segment of the LAN is received by the receive buffer of a corresponding one of the ports (source port) of the multi-port bridge. As the packet is still being received, the look-up tables are utilized to determine which is the appropriate destination port for the packet based upon the destination address.

The communication bus is monitored by each port. The look-up controller indicates which are the destination ports for the packet via the communication bus. If the source port and the destination port are the same, this indicates that the source and destination nodes are on the same segment of the LAN (intra-segment communication) and the packet is filtered. Otherwise, if the port identified as the destination port is not currently busy transmitting or receiving another packet, the destination port configures itself to receive the packet directly from the source port (cut-through).

However, if the memory pointer buffer of the destination port is nearly full, the port controller of the destination port applies a jam request signal to the communication bus. The source port receives the jam request and, in response, discards the incoming packet and also sends a jam signal over its associated segment. The jam signal causes the node (source node) which is the source of the packet to discontinue sending the packet and attempt to resend the packet after a waiting period.

Assuming the memory pointer buffer for the destination port is not nearly full (no jam request is made), the packet is loaded from the receive buffer of the source port into the packet buffers of the memory starting at the memory address identified in the memory pointer. Writing of the packet into the packet buffers preferably occurs as the remainder of the packet is still being received into the receive buffer of the source port. For this reason, the receive buffer for each port need not be capable of storing the entire data packet. In addition, if the destination port is configured for cut-through, the destination port receives the packet into its transmit buffer directly from the communication bus simultaneously with the write cycles for loading of the packet into the packet buffers. During such a cut-through operation, the packet is received into a transmit buffer of the destination port for immediate transmission to the LAN segment associated with the destination port.

Once the entire packet has been loaded into the packet buffers, the memory pointer is placed on the data lines of the communication bus. Each destination port stores the memory pointer in its memory pointer buffer. Thus, the packet is queued for transmission by the destination port. Then, when the destination port is no longer busy, the destination port retrieves the packet from the packet buffers.

While the destination port is receiving the packet into its transmit buffer from the packet buffers or directly from the source port, the destination port begins transmitting the packet to the network segment associated with the destination port. For this reason, the transmit buffer for each port need not be capable of storing an entire data packet. The destination node for the packet then begins to receive the packet from the network segment.

A limited number of bus commands are utilized for controlling the flow of packets through the multi-port bridge. In comparison to prior systems, the throughput capacity of the multi-port bridge is improved and data packets are less likely to be lost due to congestion in the multi-port bridge.

BRIEF DESCRIPTION OF THE DRAWINGS

FIG. 8 illustrates a "triplet" according to the present invention, including a first field containing an identification of a source port, a second field containing an identification of a destination port, and a third field containing a memory address.

DETAILED DESCRIPTION OF A PREFERRED EMBODIMENT

The following documents are hereby incorporated by reference: U.S. Pat. No. 764,895, issued Jun. 9, 1998, to Chung, and entitled "METHOD AND INTEGRATED CIRCUIT FOR HIGH-BANDWIDTH NETWORK SERVER INTERFACING TO A LOCAL AREA NETWORK"; U.S. Pat. No. 5,857,075, issued Jan. 5, 1999, to Chung, and entitled "METHOD AND INTEGRATED CIRCUIT FOR HIGH-BANDWIDTH NETWORK SERVER INTERFACING TO A LOCAL AREA NETWORK"; U.S. Pat. No. 5,940,597, issued Aug. 17, 1999, to Chung, and entitled "METHOD AND APPARATUS FOR PERIODICALLY UPDATING ENTRIES IN A CONTENT ADDRESSABLE MEMORY"; U.S. Pat. No. 884,040, issued Mar. 16, 1999, to Chung, and entitled, "PER-PACKET JAMMING IN A MULTI-PORT BRIDGE FOR A LOCAL AREA NETWORK".

Figure 1:
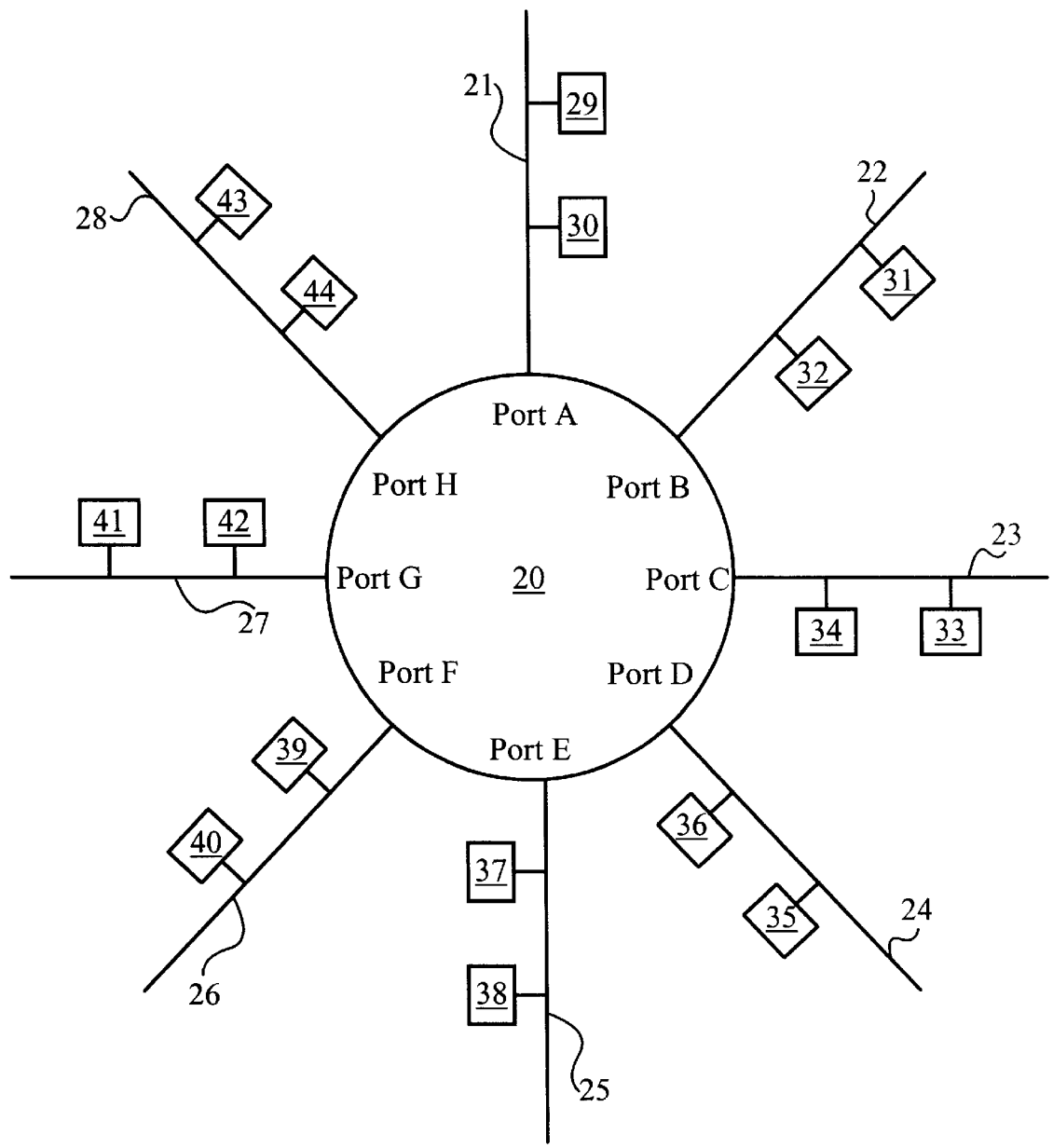
FIG. 1 illustrates a conventional local area network (LAN) including a multi-port bridge.
Figure 2:
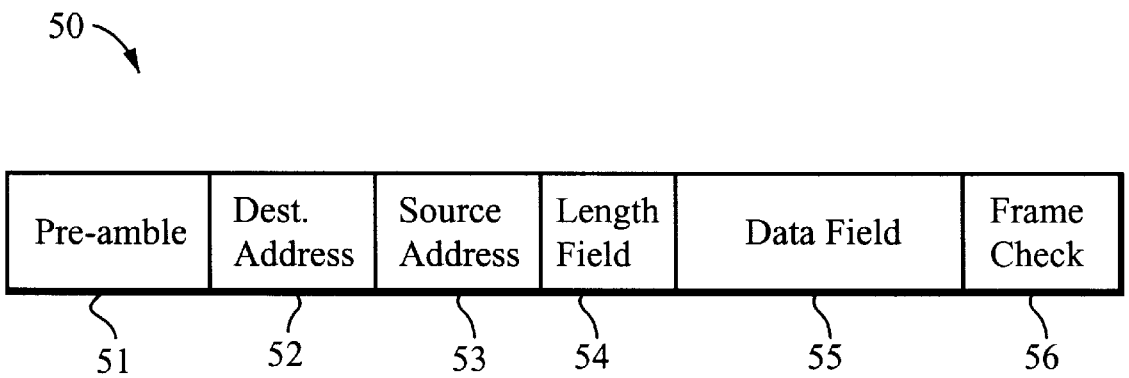
FIG. 2 illustrates a conventional IEEE 802.3 data packet.
Figure 3:
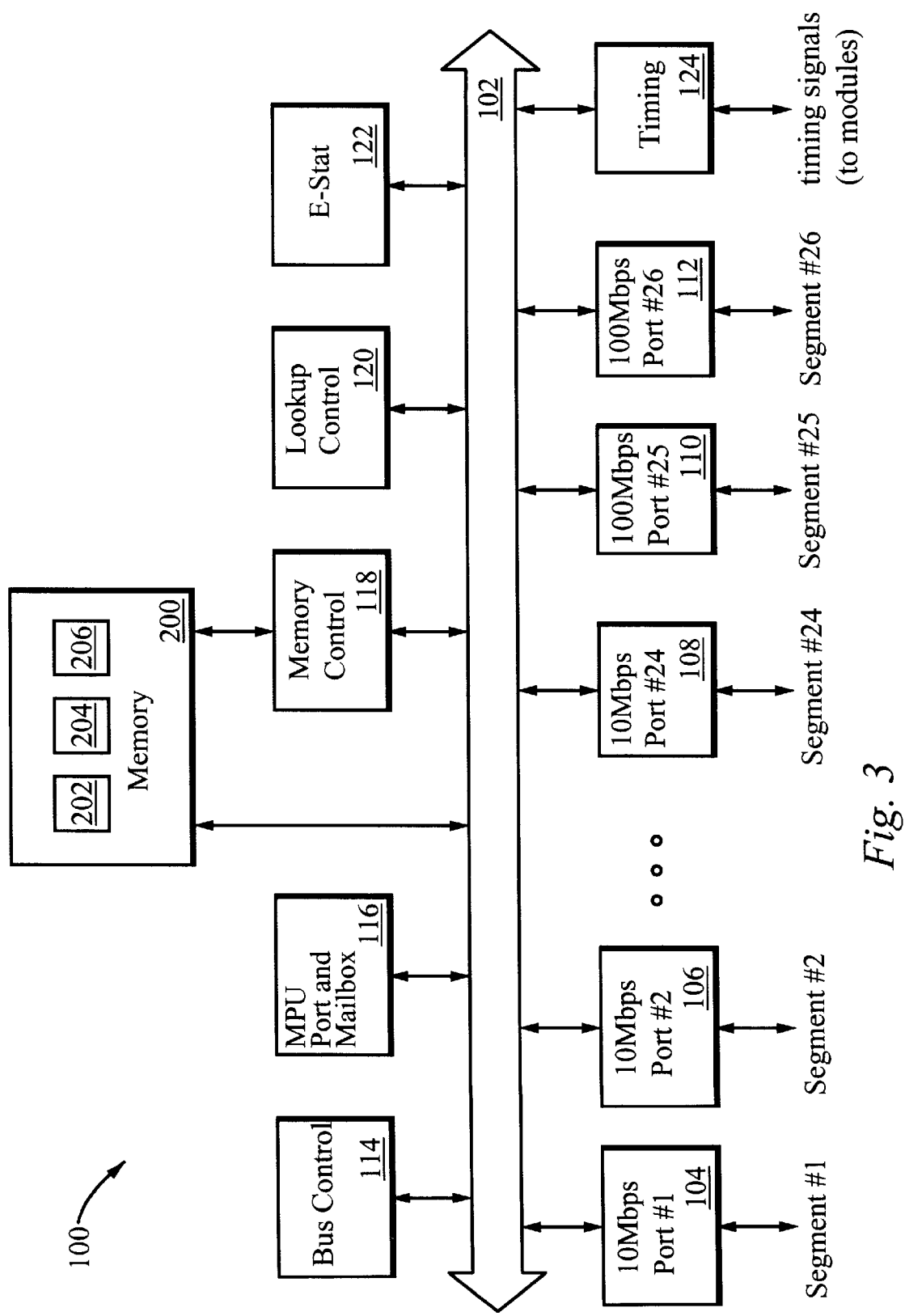
FIG. 3 illustrates a block schematic diagram of a switch engine for a multi-port bridge according to the present invention.

FIG. 3 illustrates a block schematic diagram of a switch engine 100 for a multi-port bridge according to the present invention. A high speed communication bus 102 provides an interconnection for each of the functional blocks 104–124 of the switch engine 100. According to the preferred embodiment, twenty-four 10 Mbps ports 104"108 and two 100 Mbps ports 110–112 are each coupled to the communication bus 102 and can be coupled to a respective LAN segment, each LAN segment having one or more nodes. Each of the twenty-four 10 Mbps ports 104–108 transmit and receive data packets at a rate of 10 Mbps, whereas, the two 100 Mbps ports 110–112 transmit and receive data packets at a rate of 100 Mbps. It will be apparent, however, that other numbers of ports and other port configurations can be utilized.

A bus control module 114 controls access to the communication bus 102 by collecting requests from the ports 104–112 and from the other modules. Based upon the requests, the bus control module 114 grants access to the communication bus 102 according to an appropriate priority, as explained herein. The bus control module 114 also controls access to a memory device 200 by an external processor 400 (FIG. 7), as explained herein. An MPU port and mailbox module 116 provides an interface between the switch engine 100 and the external processor 400 for performing various functions, as is also explained herein. These functions include loading data into registers of the switch engine 100, reading data from registers of the switch engine 100 and transferring data packets between the external processor 400 and the ports 104–112 of the switch engine 100.

A memory control module 118 provides an interface between the memory device 200 and the communication bus 102 and also provides an interface between the memory device 200 and a look-up control module 120. The memory device 200 includes mailboxes 202 for exchanging information between the external processor and the switch engine 100. In addition, the memory device 200 includes look-up tables 204. The look-up tables 204 include entries which indicate which port of the switch engine 100 is associated with each node of the LAN and also include group addresses for multi-cast packets. The look-up tables 204 are utilized for appropriately directing among the ports 104–112 data packets received by the switch engine 100.

The look-up control module 120 receives addresses of nodes and associated port identifications to be stored in the look-up tables 204 from the communication bus 102. These addresses and identifications are stored in the look-up tables 204. The look-up control module 120 also facilitates utilizing the look-up tables 204 for directing packets among the ports 104–112 based upon the destination address of each packet. The memory device 200 also includes packet buffers 206 for temporarily storing data packets that are being directed through the multi-port bridge. The memory device 200 is preferably an SDRAM device, though other types of memory devices can be utilized, such as DRAM, SRAM, RAM or EDO. In the case of dynamic memory, the memory control module 118 refreshes the memory device 200 as required.

An E-stat module 122 collects data packet routing statistics and provides them to the external processor 400 for performing analysis and network management functions. A timing module 124 provides timing signals to the ports 104–112 and to the other modules 114–122 of the switch engine 100. Preferably, a primary clock signal cycles at 40 MHz. Other clock signals, at 10 MHz and 25 MHz, are derived from the primary clock signal.

Preferably, the modules 114–124 are each implemented as a finite state machine, though the modules 114–124 can alternately be implemented as one or more processors or controllers operating according to stored software programs. Finite state machines are preferred, however, as they can generally perform the necessary operations faster, thus, resulting in a higher packet handling bandwidth for the switch engine 100.

Figure 4:
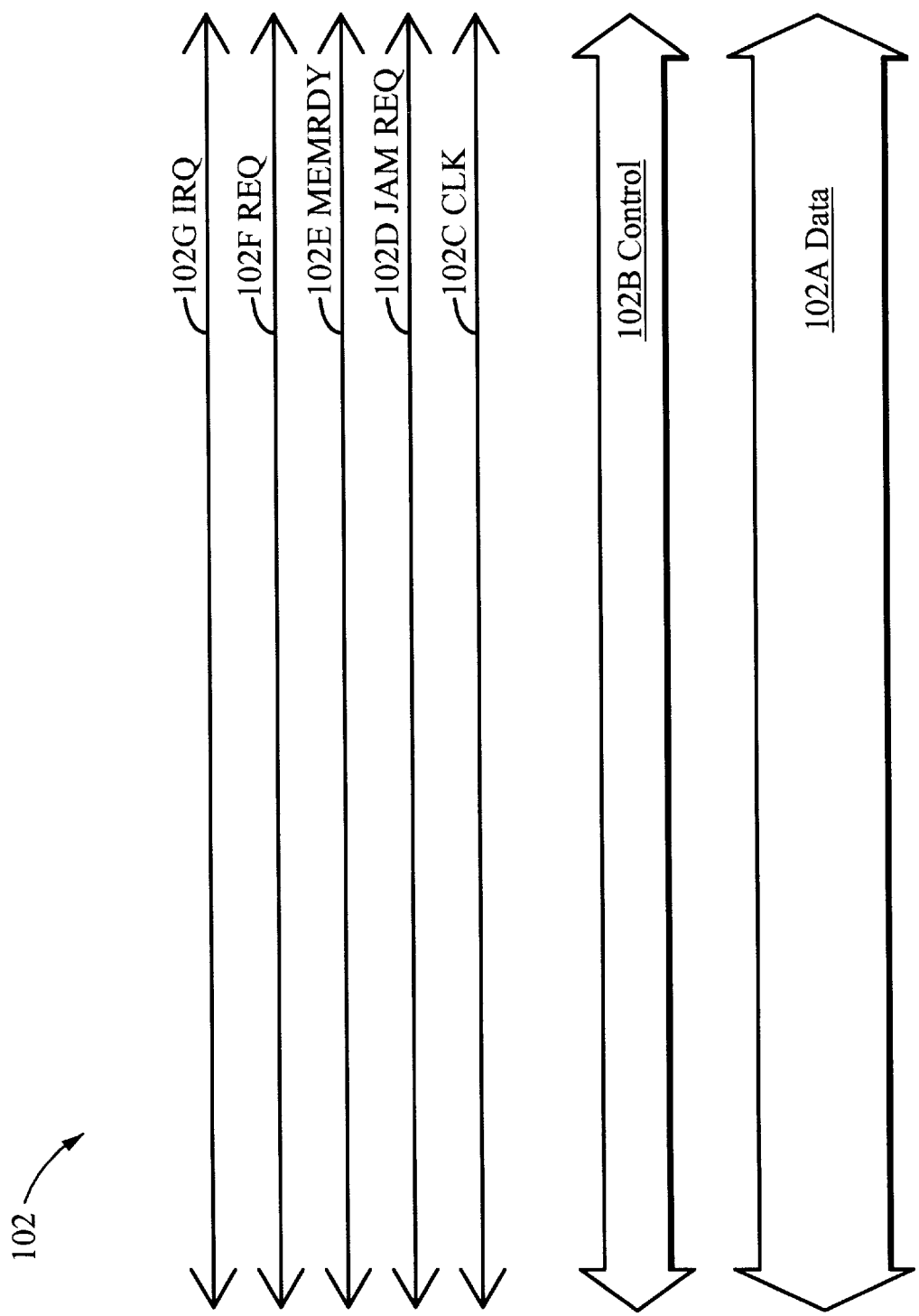
FIG. 4 illustrates a diagram of signal lines included in a high speed communication bus according to the present invention.

FIG. 4 illustrates a diagram of the signal lines included in the high speed communication bus 102 of FIG. 3. The communication bus 102 preferably includes thirty-two data lines 102A, five control lines 102B, a clock CLK line 102C, a jam request JAM REQ line 102D, a memory ready MEMRDY line 102E, a request REQ line 102F and an interrupt IRQ line 102G, though it will be apparent that other bus configurations can be utilized.

Table 1 illustrates preferred commands and associated data appearing on the communication bus 102 during operation of the multi-port bridge 100, as explained herein.

TABLE 1

| Control Code | Data 31-24 | 23-0 | Description |
|---|---|---|---|
| 00 Hex | | | transfer in progress/no action |
| 01 | # of transfer | starting memory address | memory read |
| 02 | # of transfer | starting memory address | memory write |
| 03 | source port ID & dest. and source addresses | | look-up |
| 04 | signal line of port granted access | | bus-grant-for-REQ |
| 05 | signal lines of all interrupting ports | | poll-interrupt |

TABLE 1-continued

| Control Code | Data 31-24 | 23-0 | Description |
|---|---|---|---|
| 06 | signal lines of all requesting ports | | poll-request |
| 07 | | | reserved |
| 08 | source port ID & bit-map of all dest. ports | | look-up ready |
| 09 | source port ID & dest. and source addresses | | look-up (gated with MEMRDY) |
| 0A | | | reserved |
| 0B | | | reserved |
| 0C | register data | | register load |
| 0D | register data | | register read |
| 0E | | | reserved |
| 0F | last transfer (as previously defined) | | bus-release |
| 10 | source port ID & dest. port ID | | new packet transfer to memory (cut-through possible) |
| 11 | source port ID & dest. port ID | | cont. packet transfer to memory (cut-through not possible) |
| 12 | # of transfer | memory starting address | write packet header to memory |
| 13 | | | reserved |
| 14 | signal line of port granted access | | bus-grant-for-IRQ |

Figure 5:
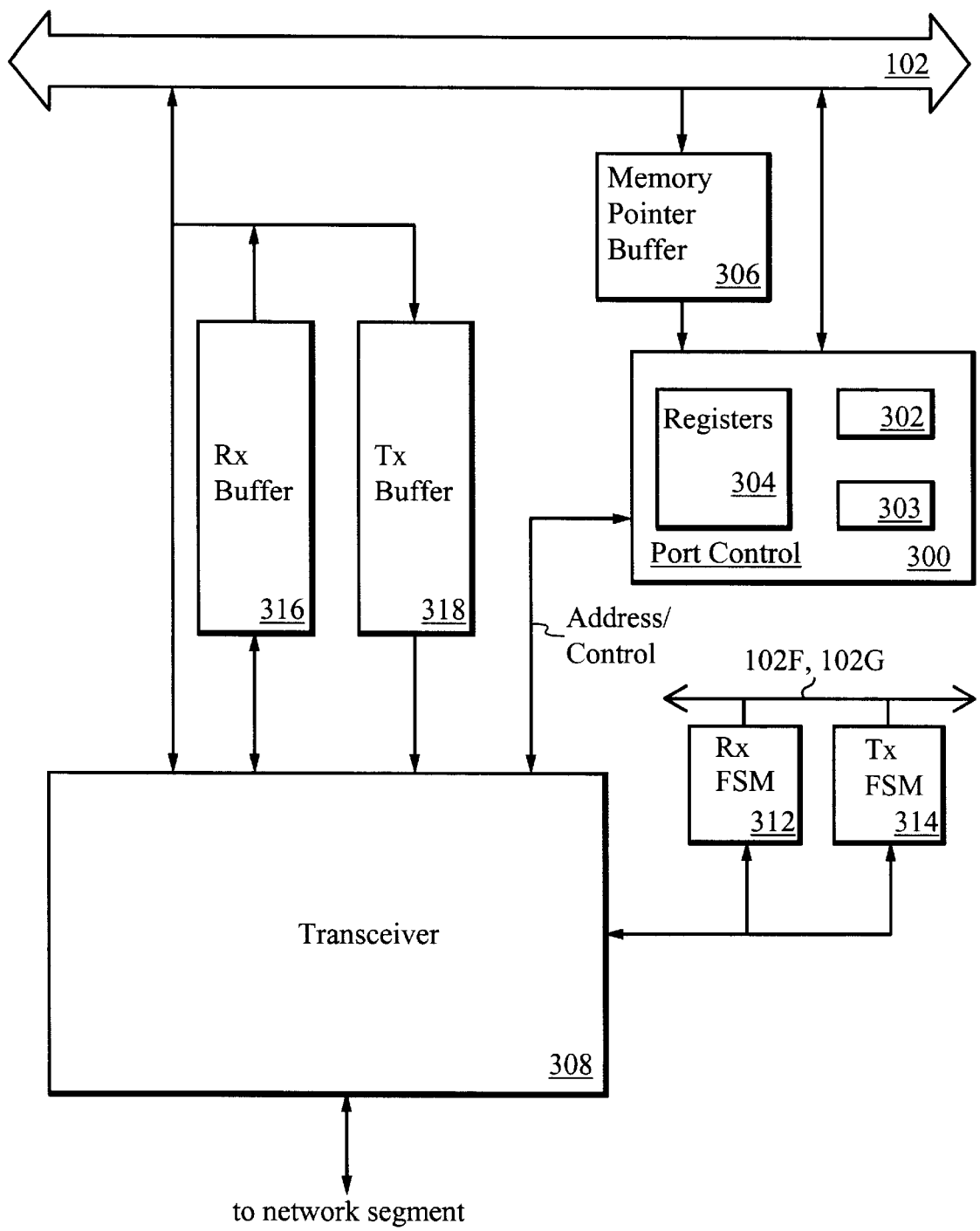
FIG. 5 illustrates a block schematic diagram of a port of the switch engine according to the present invention.

Referring to Table 1, the Control Codes (commands) placed on the control lines 102B are given as hexadecimal values, while the associated data applied to the data lines 102A and the function performed by each command are described. Because there are five control lines 102B, there can be up to thirty-two different commands (between 00 H and 1F H). As shown in Table 1, however, fewer commands are preferred. Table 1 shows hexadecimal values for the preferred embodiment. It will be apparent, however, that other bit assignments and another set of commands can be implemented and still follow the teachings of the present invention. FIG. 5 illustrates a block schematic diagram of one of the ports 104–112 of the switch engine 100 of FIG. 3. A port controller 300, including a bus interface 302, a memory pointer finite state machine (FSM) 303 and registers 304, provides control for the port and an interface between the port and the communication bus 102. The port controller 300 monitors the communication bus 102 for commands and data and also provides commands and data to the communication bus 102 at times when the port has control of the communication bus 102. The registers 304 contain data for configuring the port, initializing the port upon start-up, and for collecting status information for the port. An address latch included in the registers 304 latches addresses from the communication bus 102 and provides them to the transceiver 308. The registers 304 also contain a counter for storing a current state of the finite state machine of the port and registers for storing parameters for use by the finite state machines of the port.

Each port also includes a memory pointer FIFO buffer 306 coupled between the communication bus 102 and the port controller 300. The memory pointer buffer 306 stores memory pointers (explained herein) for data packets being queued in the packet buffers 206 (FIG. 3) of the memory device 200. Preferably, the memory pointers each have a predefined length. In addition, the memory pointer buffer 306 preferably holds 128 memory pointers, though it will be apparent that another capacity for the memory pointer buffer 306 can be selected.

The port also includes a medium access control (MAC) transceiver 308 which accesses a LAN segment 310 for transmitting and receiving data packets to and from the LAN segment 310. Associated with and coupled to the transceiver 308 are a receive finite state machine 312, for controlling the transceiver 308 during packet reception, and a transmit finite state machine 314, for controlling the transceiver 308 during packet transmission.

Packets received from the network segment 310 by the transceiver 308 are directed to the communication bus 102 through a receive FIFO buffer 316, while packets to be transmitted over the LAN segment 310 are directed from the communication bus 102 to the transceiver 308 through a transmit FIFO buffer 318. Preferably, the receive buffer 316 holds 128 bytes while the transmit buffer 318 holds 256 bytes, though other capacities can be selected. Note that an IEEE 802.3 data packet can include up to 1500 bytes of data in addition to the source address, the destination address and the frame check field. Thus, in the preferred embodiment, neither the receive buffer 316, nor the transmit buffer 318 is capable of storing an entire IEEE 802.3 data packet of the maximum size. The receive finite state machine 312 and the transmit finite state machine 314 are each coupled to the bus control module 114 (FIG. 3) for initiating access to the communication bus 102 by the port.

Access to the communication bus 102 is obtained in the following manner. The bus control module 114 monitors the interrupt IRQ line 102G and the request REQ line 102F. A port requiring access to the bus 102 raises the IRQ line 102G or the request REQ line 102F, depending upon the circumstances. The bus control module 114 grants access to the bus 102 in an appropriate priority. Preferably, an interrupt IRQ is granted access to the bus 102 according to a higher priority than a request REQ. Ports having a higher data rate have a higher priority than ports having a lower data rate. For example, the 100 Mbps ports 110–112 have a higher priority than the 10 Mbps ports 104–108. Further, assuming equal data rates, a port serviced more recently has a lower priority than a port serviced less recently.

When the bus is available after receiving an interrupt IRQ, the bus control module 114 responds to the interrupt IRQ by placing a poll-interrupt command 05 H (Table 1) on the control lines 102B of the bus 102. While the poll-interrupt command 05 H is on the control lines 102B, each port having a pending interrupt IRQ raises a corresponding one signal line of the data lines 102A. For this purpose, each of the ports 104–112 and the MPU port and mailbox 100 are assigned a respective one signal line of the data lines 102A. Accordingly, the bus control module 114 discovers which of the ports has a pending interrupt by monitoring the data lines 102A while the poll-interrupt command 05 H is active. The bus control module 114 then grants access to the bus 102 in an appropriate priority by placing a bus-grant-for-IRQ command 14 H (Table 1) on the control lines 102B of the bus 102 and also raises the respective one signal line of the data lines 102A that corresponds to the port being granted access to the bus 102. Upon being granted access to the bus 102, the designated port then has control of the bus 102.

Similarly, when the bus 102 is available after receiving a request REQ, the bus control module 114 places a poll-request command 06 H (Table 1) on the control lines 102B of the bus 102. While the poll-request command 06 H is on the control lines 102B, each port having a pending request REQ raises its corresponding one signal line of the data lines 102A. The bus control module 114 discovers which of the ports has a pending request by monitoring the data lines 102A while the poll-request command 06 H is active. The bus control module 114 then grants access to the bus 102 in an appropriate priority by placing a bus-grant-for-REQ command 04 H (Table 1) on the control lines 102B of the bus 102 and also raises the one signal line of the data lines 102A that corresponds to the port being granted access to the bus 102. Upon being granted access to the bus 102, the designated port then has control of the bus 102.

Packet flow through the multi-port bridge occurs in the following manner. A data packet, such as an IEEE 802.3 data packet, originating from a node (source node) in a segment of the local area network is received by a corresponding one of the ports 104–112 (source port) of the switch engine 100 (FIG. 3). The receive buffer 316 in the source port receives the data packet as the packet is being received by the transceiver 308 in the source port from the network segment associated with the source port. After the first twelve bytes, corresponding to the source address and the destination address for the packet, are received by the source port, the receive finite state machine 312 requests a look-up cycle from the bus control module 114 (FIG. 3) by raising the interrupt line IRQ. The bus control module 114 monitors such requests, discovers the requesting port(s) via the poll-interrupt command 05 H and grants each request according to an appropriate priority via the bus-grant-for IRQ command 14 H, as explained above.

Upon obtaining access to the bus, the source port places a look-up command 03 H (Table 1) on the control lines 102B. During successive clock cycles while the look-up command 03 H is active, an identification of the source port, the destination node address from the packet and the source node address from the packet are transferred from the source port to the look-up control module 120 (FIG. 3) via the data lines 102A. The source port identification, destination address and source address are transferred over the communication bus 102 in segments that are each four bytes long as this corresponds to the width (32 bits) of the data lines 102A of the communication bus 102. Preferably, this transfer is completed in four clock cycles. It will be apparent, however, that the communication bus 102 can have a different number of data lines, in which case, a different number of bytes can be transferred at a time.

Once the look-up control module 120 has received the source port identification, the destination address and the source address for the packet, the look-up control module 120 so notifies the memory control module 118 (FIG. 3). The memory control module 118 and look-up control module 120 then update the look-up tables 204 (FIG. 3) by ensuring that the source node address for the packet is stored in the look-up tables 204 in association with the source port identification for the packet. This ensures that the look-up tables 204 accurately reflect any changes that may have occurred in the network (this is referred to as a learning cycle).

The information stored during the learning cycle is utilized for directing subsequent packets.

Once the learning cycle is complete, the memory control module 118 and the look-up control module 120 utilize the look-up tables 204 to determine which port (destination port) is associated with the destination address for the packet. If the packet is a multi-cast packet (multiple destination ports) or a broadcast packet (all ports except the source port are destination ports), the look-up control module 120 will determine which are the multiple destination ports for the packet. Once the look-up cycle is complete, the look-up control module 120 places a look-up ready command 08 H (Table 1) on the control lines 102B of the bus 102 and, while the look-up ready command 08 H is active, the look-up control module 120 raises the respective signal lines of the data lines 102A of all the ports 104–112 which are determined to be destination ports for the packet. One signal line each corresponds uniquely with one of the ports 104–112.

Figure 6:
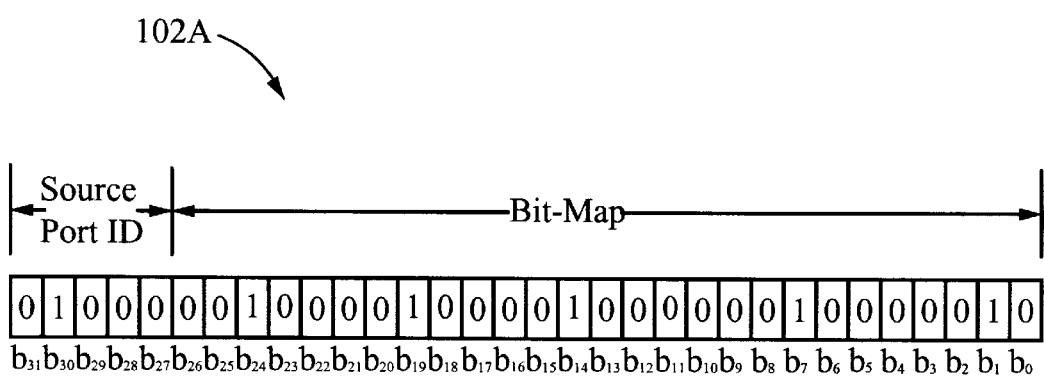
FIG. 6 illustrates a bit-map of the destination ports appearing on the high speed communication bus during a look-up ready command according to the present invention.

This raising of the respective signal lines is referred to as a bit-map of the destination ports. FIG. 6 illustrates logic levels for each of the thirty-two data lines 102A, of the bus 102 during the look-up ready command 08 H. Each one of the twenty-six ports 104–112 and the external processor 400 are assigned to a respective one of the signal lines $b_0$–$b_{31}$. Thus, for example, the external processor 400 is assigned to signal line $b_{26}$, while port #1 is assigned to signal line $b_0$, port #2 is assigned to signal line $b_1$, port #3 is assigned to signal line $b_2$, and so forth, with port #26 assigned to signal line $b_{25}$. In the preferred embodiment, signal lines $b_{27}$–$b_{31}$ are not included in the bit-map. Rather, the signal lines $b_{27}$–$b_{31}$ identify the source port. A multi-port bridge, however, could include more or fewer ports, in which case, the bit assignments would be different.

Assume that the look-up cycle for a packet having port #9 as its source port determines that the packet is multi-cast having destination nodes associated with destination ports #1, #7, #12, #19 and #24. Therefore, during the look-up ready command 08 H, the bit-map of the destination ports will include logic one's for signal lines $b_0$, $b_6$, $b_{11}$, $b_{18}$ and $b_{23}$; signal lines $b_{27}$–$b_{31}$ identify port #9 as the source port; and the remaining signal lines $b_1$–$b_5$, $b_7$, $b_9$–$b_{10}$,$b_{12}$–$b_{17}$, $b_{19}$–$b_{22}$ and $b_{24}$–$b_{26}$ are logic zeros.

Each port monitors the communication bus 102 for the look-up ready command 08 H appearing on the control lines 102B and the associated bit-map of the destination ports appearing on the data lines 102A. The bit-map allows each destination port for the packet to be simultaneously notified of its status as a destination port. If the source port for the packet is also designated as the only destination port for the packet during the look-up ready command 08 H, this indicates that the destination node for the packet is in the same network segment as the source node (intra-segment communication). As such, the source port should not retransmit the packet because the destination node would have already received the packet at the same time that the source port received the packet. When this occurs and the packet has a single destination, the packet is filtered. To filter the packet, the source port preferably takes no further action relative to the packet.

If any destination port having its signal line raised during the look-up ready command 08 H has a memory pointer buffer 306 that is full or nearly full, such destination port raises the JAM REQ line 102D (FIG. 4) while the look-up ready command 08 H is still active. During the look-up ready command 08 H, the source port monitors the JAM REQ line 102D for such a jam request. In response to a jam request, the source port discards the incoming packet and also sends a jam signal over its associated segment. The jam signal will cause the node (source node) which is the source of the packet to discontinue sending the packet and attempt to resend the packet after a waiting period.

Once the look-up ready command 08 H is no longer active, the source port for the packet places a bus-release command 0F H (Table 1) on the control lines 102B of the data bus 102. This releases control of the bus 102 by indicating to the bus control module 114 that the bus is available.

The bus control module 114 then responds to any pending interrupts or requests for access to the bus 102 by granting access to the bus in an appropriate priority. Thus, while the packet is still being received by the source port, but after the determination is made whether to filter or jam the incoming packet, the bus 102 can be utilized for other purposes.

Meanwhile, returning the example, the packet continues being received by the source port. Once 64 bytes of the packet have been received, the source port requests access to the bus again, this time by raising the REQ line 102F. The bus control module 114 grants access to the source port in an appropriate priority by placing a bus-grant-for-REQ command 04 H on the control lines 102B and raises the signal line corresponding to the source port.

The packet buffers 206 include a space allocated to each port for storing packets received by the port. Each port controller 300 keeps track of the space allocated to the port and determines a location in the packet buffers 206 for each packet received by the port. Preferably, the packets are written into the allocated space in a circular fashion; each new packet overwrites portions of the oldest packet in the allocated space.

The source port initiates a series of memory write cycles for loading the packet from the receive buffer 316 of the source port into the allocated space in the packet buffers 206 by first placing a new packet transfer command 10 H (Table 1) on the control lines 102B and by placing the source port ID and the bit-map for the destination ports on the data lines 102A (raising the signal lines corresponding to each destination port for the packet). If any destination port having its signal line raised during new packet transfer command 10 H is not currently busy transmitting or receiving another packet, such destination port configures itself to receive the packet directly from the source port (cut-through). Destination ports that are currently busy ignore the packet for now and retrieve the packet from the packet buffers 206 later, when they are no longer busy.

Following the new packet transfer command 10 H, the source port places a memory write command 02 H (Table 1) on the control lines 102B of the bus 102. During a first bus clock cycle while the memory write command 02 H is active, the source port places on the data lines 102A one byte of information which indicates the number of bus cycles which will be required to complete the entire transfer. The number of bus cycles depends upon how much of the packet was received in the source port while the source port awaited access to the bus 102. Also during the first bus clock cycle while the memory write command 02 H is active, the source port places on the data lines 102A three bytes of information which indicates a starting address within the packet buffers 206 for the memory write cycles. The memory control module 118 receives this information for performing the memory write operation.

Simultaneously with the writing of the packet into the memory buffers 206, each destination port configured for cut-through receives the packet directly from the bus 102 into its transmit FIFO 318 and immediately begins transmitting the packet to the appropriate destination node on its associated network segment under control of its transmit finite state machine 314. The destination node for the packet then begins to receive the packet from the network segment.

In subsequent bus clock cycles while the memory write command 02 H is active, the source port places the packet on the data lines 102A in four byte portions (corresponding to the width of the data lines 102A), one portion for each clock cycle, until the memory write operation is completed. Simultaneously, destination ports configured for cut-though continue to receive the packet and continue to transmit the packet to their associated network segment. When the memory write operation is completed, the source port releases the bus via the bus-release command 0F H.

Once the next 64 bytes of the packet is received by the source port, the source port again requests access to the bus 102 by raising the REQ line 102F and initiates a next memory write operation for loading the packet into the packet buffers 206. The source port first places a continuation packet transfer command 11 H (Table 1) on the control lines 102B and, while the continuation packet command 11 H is active, the source port places the bit-map for the destination ports on the data lines 102A (raises the signal lines corresponding to each destination port for the packet). Only those destination ports having their signal lines raised and that had already been receiving the packet directly from the source port (those destination ports configured for cut-through) will continue to receive the next installment of the packet directly from the source port. Other destination ports will continue to ignore the packet. This is true even if a destination port that was busy during the new packet transfer command 10 H has become available because such a port would not have obtained the first installment of the packet. Then, the source port places the memory write command 02 H on the data lines 102A and places one byte of information indicating the number of bus cycles required and three bytes indicating the starting address for this write operation. Then, the port releases the bus via the bus-release command 0F H. This process repeats, including requesting access to the bus and placing the continuation packet transfer command 10 H on the bus 102, for each successive 64 byte portion of the packet until the entire packet is loaded into the packet buffers 206. Because writing of the packet in the packet buffers 206 preferably occurs as the remainder of the packet is still being received into the receive buffer 316 of the source port, the receive buffer 316 for each port need not be capable of storing an entire data packet.

The packet is preferably loaded into the packet buffers 206 a predetermined offset from an assigned starting address. This provides a location for storing a header for the packet once the packet has been completely loaded into the packet buffers 206. For example, the header includes an identification number assigned to the packet, an indication of the destination ports for the packet, the receive status for the packet, the length of the packet, the source node address for the packet and the destination node address for the packet. The receive status indicates whether or not the entire packet has been successfully received and loaded into the packet buffers 206. Preferably, the header is eight bytes long, though it will be apparent that another length can be selected for the header.

After the last data is transferred such that the entire packet has been stored in the packer buffers 206, the source port retains control of the bus 102 and stores the header for the packet in the packet buffers 206. This is accomplished by the source port placing a packet header command 12 H on the control lines 102B. During a first clock cycle while the packet header command 12 H is active, the source port places one byte of information indicating the number bus clock cycles required to write the entire header into the memory buffers 206 and places three bytes of information indicating the assigned starting address for the packet. During successive bus clock cycles, the header is written into the packet buffers beginning at the assigned starting address.

Each port monitors the communication bus 102 for the packet header command 12 H. While the packet header command 12 H is active, each port receives the packet header information. Each port which is identified as a destination port in the packet header checks the receive status for the packet and, if the packet was successfully received and stored in the packet buffers 306, the destination port stores at least the assigned starting address for the packet in its memory pointer buffer 306. Preferably, the destination port also stores the identification number assigned to the packet in the memory pointer buffer 306 along with the assigned starting address for the packet. If the receive status indicates an error, however, the starting address in the packet buffers is not stored and no further action is taken by the destination ports relative the packet. Finally, the source port releases control of the bus 102 via the bus release command 0F H. This completes the actions taken by the source port relative the packet.

Each port monitors its memory pointer buffer 306 and initiates retrieval of packets from the packet buffers 206. Thus, returning to the example packet, as soon as the destination port becomes available, it removes the identification number for the packet and the assigned starting address for the packet from its memory pointer buffer 306. Then, the destination port requests access to the bus by raising the request line REQ. Once the bus control module grants access to the bus 102, via the bus-grant-for-REQ command 04 H, the destination port first retrieves the header for the packet from the packet buffers 206. Thus, the destination port initiates a read operation by placing a memory read command 01 H (Table 1) on the control lines 102B of the bus 102. During a first clock cycle while the memory read command 01 H is active, the destination port places on the data lines 102A of the bus 102 one byte of information indicating the number of bus clock cycles for the read operation (e.g. the number of transfers required to retrieved the header) and three bytes of information indicating the assigned starting address for the packet.

Once the packet header is retrieved from the packet buffers 206, the destination port checks the packet identification number that is included in the header retrieved. If the packet identification number retrieved from the packet buffers 206 does not match the packet identification number stored in the memory pointer buffer 306, this indicates that the packet became corrupted in the packet buffers 306 after it was stored. For example, if a portion of the packet was overwritten by a later packet, the identification number will also be overwritten, such that it does not match the identification number stored in the memory pointer buffer 306 of the destination port. In addition, the destination port obtains the length of the packet so that it can determine the appropriate number of memory read cycles that will be required to transfer the entire packet.

While the destination port is retrieving the packet from the packet buffers 206, the destination port simultaneously transmits the packet to its associated segment under control of the transmit finite state machine 314. For this reason, the transmit FIFO 318 in each port need not be capable of storing more than a single packet of the maximum length. Preferably, the packet is retrieved from the packet buffers 206 in multiple installments until the entire packet has been retrieved from the packet buffers 206. An installment is initiated each time the transmit FIFO 318 is nearly empty. Each installment is retrieved by the destination port obtaining access to the bus 102; placing a memory read command 01 H on the bus 102 while specifying a number of memory transfers required for the installment; and releasing the bus via the bus release command 0F H after performing the specified number of transfers. Accordingly, the transmit FIFO 318 preferably need not be capable of storing a packet of maximum length. Because the bus 102 is released between installments, other ports can access the bus for other purposes simultaneously with the destination port transmitting the packet to its associated network segment.

In the event that a cut-through or transmit operation was initiated, but was unsuccessful, the packet will need to be retransmitted by the destination port. For example, the cut-through or transmit operation may have been unsuccessful if a data collision occurred during transmission of the packet over the segment associated with the destination port. In such case, the packet is retrieved from the packet buffers 206 as described above and re-transmitted by the destination port.

While the destination port is receiving the packet into its transmit buffer 318 from the packet buffers 206, the destination port begins transmitting the packet to the LAN segment associated with the destination port. The packet is then received from the network segment by the destination node for the packet.

Thus, if the destination port is configured for cut-through, the destination port will receive the packet into its transmit buffer 318 directly from the communication bus 102 simultaneously with the write cycles for loading of the packet into the packet buffers 206. During such a cut-through operation, the packet is received into a transmit buffer 318 of the destination port for immediate transmission to the LAN segment associated with the destination port. If the packet is a broadcast or multi-cast-packet, one or more of the destination ports can receive the packet directly from the source port, while one or more other destination ports for the packet can retrieve the packet from the packet buffers 206 once those destination ports are no longer busy.

Figure 7:
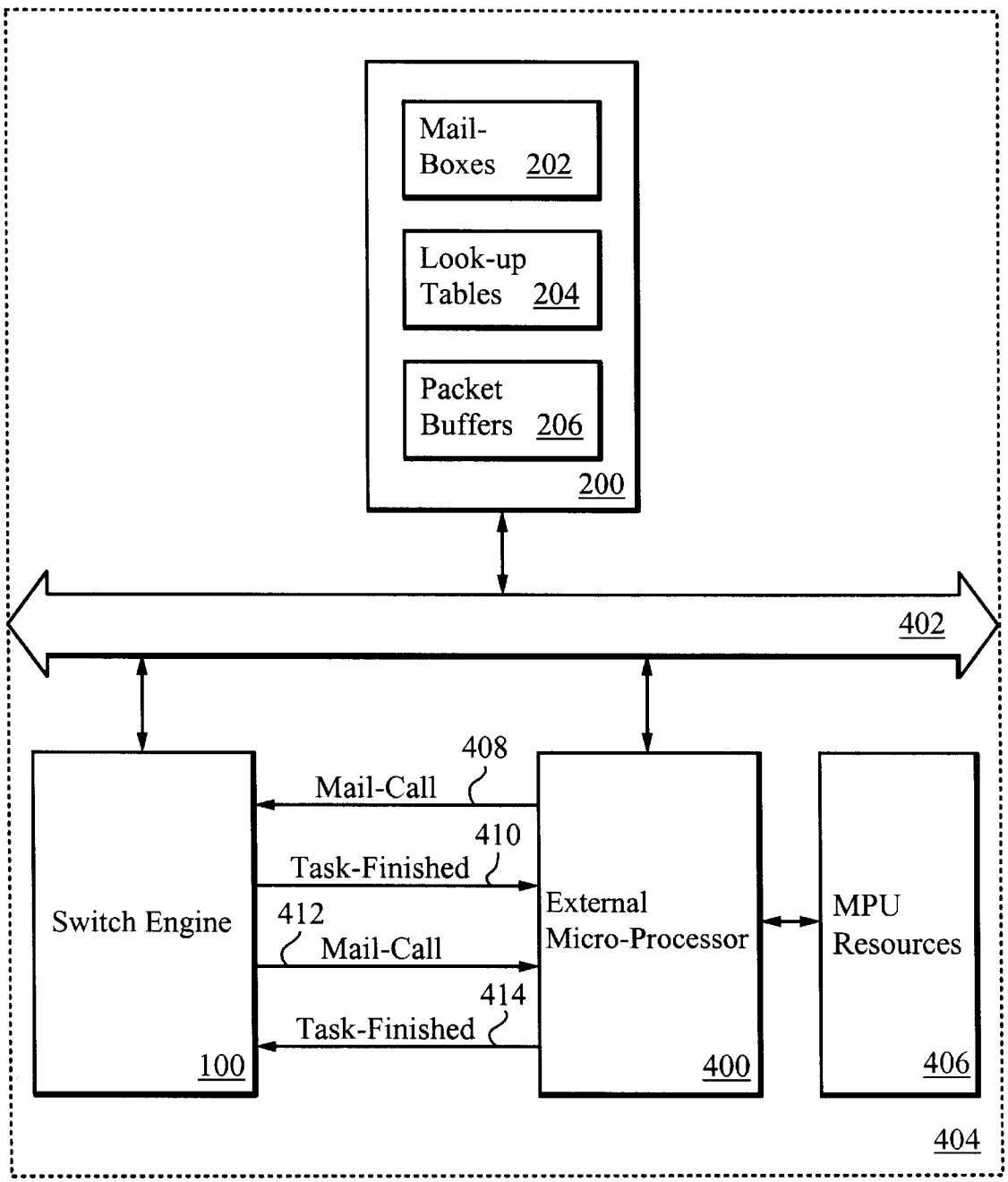
FIG. 7 illustrates a block schematic diagram of the switch engine, a memory device and an external processor according to the present invention.

FIG. 7 illustrates a block schematic diagram of the switch engine 100, the memory device 200 and an external processor 400 according to the present invention. A memory bus 402 interconnects the switch engine 100 and the external processor 400 to the memory device 200. Preferably, access to the memory device 200 by the switch engine 100 and the external processor 400 is implemented by a multiplexor included as part of the memory bus 402 and which multiplexor is controlled by the switch engine 100. The switch engine 100, including the communication bus 102 (FIG. 3), is preferably implemented as an integrated circuit mounted to a printed circuit board 404. The memory device 200 and the external processor 400 are also mounted to the printed circuit board 404.

As described above in reference to FIGS. 3–6, the bridging and filtering functions of the multi-port bridge are performed primarily by the switch engine 100 and the buffer memory 200. Because the switch engine 100 is preferably implemented as a number of finite state machines interconnected via the communication bus 102, the switch engine 100 provides a high bandwidth capacity for directing data packets through the multi-port bridge. Thus, according to the present invention, the external processor 400 is provided to perform tasks in support of the functioning of the switch engine 100. These functions include: providing a communication port for enabling the nodes of the LAN to communicate with nodes of a dissimilar LAN or a WAN and for enabling the nodes of the LAN to communicate with a file server for the LAN; providing parameters for initializing registers of the switch engine via a register load command 0C (Table 1); collecting data from the LAN for performing network management functions via a register read command 0D (Table 1); and providing services to the switch engine 100. The mailbox interface according to the present invention allows the external processor 400 to provide these functions without the need to dedicate a large number of pins of the integrated circuit package to such an interface.

Preferably, the external processor 400 is implemented as a reduced instruction set computer (RISC) to improve speed performance. The external processor 400 can have its own dedicated resources 406, such as memory for storing operating software for the external processor 400 and for use by the external processor 400 as a scratch pad. In addition, when the external processor 400 performs the functions of a file server for the LAN, the resources 406 can include a mass storage device for storing application programs and data files which is accessible by the external processor 400. Also, when the external processor 400 performs the function of providing an interconnection of the LAN to a dissimilar LAN or to a WAN, the resources 406 can include a communication device, such as a telephone modem, an integrated services digital network (ISDN) interface, a T1 media interface or a T3 media interface which is accessible by the external processor 400. In addition, multiple external processors 400 can be coupled to the memory bus 402. In such case, additional resources can be provided for such multiple external processors, such as one or more mass storage devices and/or one or more communication devices.

When a packet is originated by the external processor 400, the destination address and source address for the packet are placed in the memory 200 by the external processor 400. Thus, rather than obtaining the destination and source addresses from the source port, the destination and source addresses are obtained from the memory 200. The memory control module 118 places a look-up gated with MEMRDY command 09 H on the control lines 102B of the bus 102, retrieves the destination address and source address from the memory 200, and places them on the data lines 102A. As with the look-up command 03 H, transfer of the destination and source addresses is performed over several bus clock cycles. The look-up control module 120 responds to the look-up gated with MEMRDY command 09 H by waiting until the MEMRDY line 102E is raised to a logic high voltage level before beginning to receive the destination and source addresses for performing a look-up cycle. This ensures that the destination and source addresses appearing on the data lines 102A are valid before the look-up control module 120 receives them.

In an alternate embodiment, the memory pointer buffer 306 of each port stores memory pointers, referred to as "triplets" for data packets being queued in the packet buffers 206 of the DRAM memory 200, rather than the memory pointers described above (having a packet identification number and memory starting address). FIG. 8 illustrates a "triplet" according to the present invention. Each triplet includes three fields: a first field 500 containing the identification of the source port, a second field 502 containing the identification of the destination port, and a third field 504 containing a starting address assigned to the incoming packet in the packet buffers 206.

As before, while a packet is being received by the source port, a look-up cycle is initiated by the source port to identify the appropriate destination port for the packet based upon the destination address. A result of performing the look-up for each packet, however, is a triplet. The starting address contained in the triplet is assigned by the memory control module 118. While the packet is being received by the source port, the memory control module 118 places an "initial" triplet on the data lines 102A of the communication bus 102 and places a corresponding initial triplet command on the control lines 102B. This is in contrast to placing the bit-map of the destination ports on the data lines 102A and placing the associated the look-up ready command 08 H on the control lines 102B, as described above. The initial triplet is received by each port. If the source port and the destination port are the same, this indicates that the source and destination nodes are on the same segment of the LAN (intra-segment communication). The source port recognizes this condition and, in response, filters the packet.

If the port identified as the destination port in the triplet is not currently busy transmitting or receiving another packet, the destination port configures itself to receive the packet directly from the source port (cut-through). However, if the memory pointer buffer 306 in the port identified as the destination port in the triplet is nearly full, the bus controller 300 of the destination port raises the JAM REQ line 102D. The source port receives the jam request and, in response, discards the incoming packet and also sends a jam signal over its associated segment. The jam signal causes the node (source node) which is the source of the packet to discontinue sending the packet and attempt to resend the packet after a waiting period.

The packet is loaded from the receive buffer of the source port into the packet buffers 206 starting at the memory address identified by the third field of the triplet. As before, a predetermined offset provides a space for storing header information for the packet. Writing of the packet into the packet buffers 206 preferably occurs as the remainder of the packet is still being received into the receive buffer of the source port. For this reason, the receive buffer 316 for each port need not be capable of storing the entire data packet. In addition, if the destination port is configured for cut-through, the destination port will receive the packet into its transmit buffer 318 directly from the communication bus 102 simultaneously with the write cycles for loading of the packet into the packet buffers 206. During such a cut-through operation, the packet is received into the transmit buffer 318 of the destination port and immediately transmitted to the LAN segment associated with the destination port.

Once the entire packet has been loaded into the packet buffers, the memory control module 118 places a "final" triplet on the data lines 102A of the communication bus 102 and places a corresponding final triplet command on the control lines 102B. It should be noted that the bit patterns for the initial triplet and for the final triplet are preferably identical, while the bit patterns placed on the command lines of the communication bus 102 for identifying each of the initial and final triplets are distinct. The destination port receives the final triplet and stores it in its memory pointer buffer 306. This is in contrast to placing the packet identification and assigned starting address in the memory pointer buffer, as described above. Thus, the packet is queued for transmission by the destination port.

Then, when the destination port is no longer busy, the destination port retrieves the packet from the packet buffers 206 by gaining access to the communication bus 102 and initiates a series of read operations over the communication bus 102 beginning at the starting address in the packet buffers 206 of the packet (from the third field of the triplet for the packet).

In both embodiments, the memory pointers stored in the memory pointer buffer 306 of each port are preferably of a uniform size. Therefore, the exact number of memory pointers that can be accommodated by a memory pointer buffer 306 of a port can be determined from the amount of space available in the memory pointer buffer 306 of the port. Accordingly, unlike prior arrangements, extra space does need to be provided in the port to accommodate a data packet having an unknown length. According to the present invention, however, the jam request (raising the JAM REQ line) is preferably generated by a destination port for a packet when the memory pointer buffer 306 in the port is nearly full, but has space available to store several memory pointers (e.g. ten). This provides the destination port an ability to store memory pointers for packets which are in the process of being loaded into the packet buffers 206. The memory pointer buffer 306 in each port is preferably sized relative to the associated packet buffers 206 in the memory device 200 such that there is only a small possibility that the packet buffers 206 will become full before any memory pointer buffer 306 becomes full. For example, because each port can hold up to 128 memory pointers, the packet buffers 206 can preferably accommodate 128 data packets of the maximum size for each port. In practice, the packet buffers 206 can be somewhat smaller because not every packet is expected to have the maximum size.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. A multi-port bridge for connecting a plurality of segments of a local area network, the multi-port bridge comprising:

a. a plurality of ports, each port for interfacing between the multi-port bridge and one of the plurality of segments;

b. a communication bus having a plurality of signal lines, the bus coupled to each of the plurality of ports, wherein data packets are communicated between the ports via the bus and further wherein each packet is received into a receive buffer in the corresponding port and transferred to an assigned location in a memory common to each port; and a control circuit coupled to the bus, wherein each one of the ports corresponds to one of the signal lines, and further wherein the control circuit applies a selected logic level to an appropriate one of the signal lines to condition a predetermined port to receive a data packet.

2. The multi-port bridge according to claim 1 wherein the control circuit notifies each port whether the port is a destination for the packet while the packet is still being received by the multi-port bridge.

3. The multi-port bridge according to claim 1 wherein a port that is not busy receiving or transmitting when the port is notified that it is a destination for the packet receives the packet while the packet is being transferred to an assigned location in the memory.

4. The multi-port bridge according to claim 3 wherein a port that is busy receiving or transmitting when the port is notified that it is a destination for the packet retrieves the packet from the memory after the port is no longer busy.

5. The multi-port bridge according to claim 4 wherein the packet has a plurality of destinations and at least one of the plurality of destinations at receives the packet while the packet is being transferred to the assigned location in the memory and at least one other of plurality of destinations retrieves the packet from the memory.

6. The multi-port bridge according to claim 1 wherein the memory is divided into portions, one portion for each port, and wherein the assigned location for each packet is within the portion of the memory assigned to the corresponding port.

7. The multi-port bridge according to claim 6 wherein each packet is stored in the portion of the memory assigned to the corresponding port is a circular fashion wherein more recently stored packets overwrite less recently stored packets.

8. The multi-port bridge according to claim 1 wherein each port that is a destination for a packet stores indicia of the assigned location in the memory for the packet.

9. The multi-port bridge according to claim 8 wherein the indica includes an identification number assigned to the packet and an address of the location in the memory assigned to the packet.

10. The multi-port bridge according to claim 9 wherein the identification number is stored in the memory in conjunction with the packet and when the packet is retrieved from the memory the identification number included in the indica is compared to the identification number stored in conjunction with the packet.

11. The multi-port bridge according to claim 9 wherein a port having stored indica of a location retrieves the packet stored at the location at an appropriate time after the packet is stored.

12. The multi-port bridge according to claim 1 wherein the packet has a maximum expected size and the receive buffer is smaller than the maximum expected size.

13. The multi-port bridge according to claim 8 wherein each port further comprises a transmit buffer for receiving packets to be transmitted by the port.

14. The multi-port bridge according to claim 13 wherein the packet has a maximum expected size and each transmit buffer is smaller than the maximum expected size.

15. A multi-port bridge for interconnecting a plurality of segments of a local area network, the multi-port bridge comprising:
   a. a communication bus having a plurality of signal lines;
   b. a plurality of ports coupled to the communication bus, each port for receiving data packets from a corresponding segment of the local area network and for transmitting data packets bridged by the multi-port bridge to the corresponding segment, wherein one signal line of the plurality is assigned to each port of the plurality and further wherein each packet is received into a receive buffer in the corresponding port and transferred to an assigned location in a memory common to each port; and
   c. a control circuit coupled to the communication bus, wherein the control circuit determines which of the ports are a destination for each packet based upon a destination address contained in the packet wherein the control circuit notifies each port whether the port is a destination for the packet by applying a selected logic level to the signal line of each port, wherein the control circuit notifies each port whether the port is a destination for the packet while the packet is still being received by the multi-port bridge.

16. The multi-port bridge according to claim 15 wherein a port that is not busy receiving or transmitting when the port is notified that it is a destination for the packet receives the packet while the packet is being transferred to an assigned location in the memory.

17. The multi-port bridge according to claim 16 wherein a port that is busy receiving or transmitting when the port is notified that it is a destination for the packet retrieves the packet from the memory after the port is no longer busy.

18. The multi-port bridge according to claim 17 wherein the packet has a plurality of destinations and at least one of the plurality of destinations at receives the packet while the packet is being transferred to the assigned location in the memory and at least one other of plurality of destinations retrieves the packet from the memory.

19. The multi-port bridge according to claim 15 wherein the memory is divided into portions, one portion for each port, and wherein the assigned location for each packet is within the portion of the memory assigned to the corresponding port.

20. The multi-port bridge according to claim 19 wherein each packet is stored in the portion of the memory assigned to the corresponding port is a circular fashion wherein more recently stored packets overwrite less recently stored packets.

21. The multi-port bridge according to claim 15 wherein each port that is a destination for a packet stores indicia of the assigned location in the memory for the packet.

22. The multi-port bridge according to claim 21 wherein the indica includes an identification number assigned to the packet and an address of the location in the memory assigned to the packet.

23. The multi-port bridge according to claim 22 wherein the identification number is stored in the memory in conjunction with the packet and when the packet is retrieved from the memory the identification number included in the indica is compared to the identification number stored in conjunction with the packet.

24. The multi-port bridge according to claim 22 wherein a port having stored indica of a location retrieves the packet stored at the location at an appropriate time after the packet is stored.

25. The multi-port bridge according to claim 15 wherein the packet has a maximum expected size and the receive buffer is smaller than the maximum expected size.

26. The multi-port bridge according to claim 21 wherein each port further comprises a transmit buffer for receiving packets to be transmitted by the port.

27. The multi-port bridge according to claim 26 wherein the packet has a maximum expected size and each transmit buffer is smaller than the maximum expected size.

28. A method of controlling flow of packets in a multi-port bridge having a plurality of ports interconnected to a memory device by a communication bus, the multi-port bridge for interconnecting a plurality of segments of a local area network, the method comprising steps of:
   a. receiving a destination address for a data packet in a source port;
   b. determining which one or more of the plurality of ports are a destination port for the packet based upon the destination address;
   c. notifying the one or more destination ports of their status as a destination port separate from a step of transmitting a data packet to the destination port;
   d. assigning a location in the memory device to the packet;
   e. forming indicia of the location;
   f. receiving the indicia in the one or more destination ports; and
   g. storing the packet at the location.

29. The method according to claim 28 wherein the source port obtains access to the communication bus a first time for initiating the steps of determining and notifying and wherein the source port releases the communication bus after completion of the steps of determining and notifying.

30. The method according to claim 29 wherein the source port obtains access to the communication bus a second time for initiating the step of storing and wherein the source port releases the communication bus after initiating the step of storing.

31. The method according to claim 30 wherein the source port obtains access to the communication bus a third time for completing the step of storing and wherein the source port releases the communication bus after completing the step of storing.

32. The method according to claim 28 wherein the step of determining comprises steps of:
   a. transferring the destination address to a control circuit; and
   b. comparing the destination address to entries in a table.

33. The method according to claim 28 wherein the step of notifying comprises steps of:
   a. forming a bit-map for the packet wherein each of the plurality of ports is assigned a respective one signal line of the communication bus, the bit-map including a logic level for each signal line assigned to a port wherein the logic level is indicative of whether the respective port is a destination port for the packet; and
   b. placing the bit-map on the communication bus.

34. The method according to claim 28 wherein the indicia includes an identification assigned to the packet and an address in the memory device representative of the location.

35. The method according to claim 28 wherein the step of storing is performed while the packet is being received by the source port.

36. The method according to claim 28 further comprising a step of retrieving the packet from the location into at least one of the destination ports for the packet.

37. The method according to claim 36 wherein at least one of the destination ports for the packet obtains access to the communication bus a first time for initiating the step of retrieving and then releases the communication bus and obtains access to the communication bus a second time for completing the step of retrieving and then releases the communication bus.

38. The method according to claim 36 further comprising a step of transmitting the packet while the packet is being retrieved from the location.

39. The method according to claim 28 further comprising a step of receiving the packet from the source port into at least one of the destination ports for the packet while the packet is being stored at the location.

40. The method according to claim 39 further comprising a step of transmitting the packet while the packet is being received from the source port.

41. The method according to claim 39 further comprising a step of retrieving the packet from the location into at least one of the destination ports for the packet after the packet has been stored at the location.

42. A method of controlling flow of packets in a multi-port bridge having a plurality of ports interconnected to a memory device by a communication bus, the multi-port bridge for interconnecting a plurality of segments of a local area network, the method comprising steps of:
   a. receiving a packet having a destination address from a segment associated with a source port for the packet into a receive buffer in the source port;
   b. looking-up the destination address in a table for determining one or more destination ports for the packet;
   c. assigning a location in the memory device to the packet;
   d. forming a bit-map for the packet wherein each of the plurality of ports is assigned a respective one signal line of the communication bus, the bit-map including a logic level for each signal line assigned to a port wherein the logic level is indicative of whether the respective port is a destination port for the packet;
   e. placing the bit-map on the communication bus;
   f. loading the packet into the memory device at the location in the memory device assigned to the packet; and
   g. determining whether each destination port is available to receive the packet and if any destination port is available to receive the packet, performing a step of receiving the packet into a transmit buffer in each available destination port from the source port simultaneously with loading the packet into the memory device.

43. The method according to claim 42 further comprising a step of transmitting the packet performed while the packet is being received into the transmit buffer of each available destination port.

44. The method according to claim 42 wherein the packet also has a data field and wherein the step of looking-up the destination address is performed while the data field is being received by the source port.

45. The method according to claim 42 wherein the step of loading the packet into the memory device is performed while the data field is being received by the source port.

46. The method according to claim 42 further comprising a step of storing indicia of the location in each destination port determined to be unavailable during the step of determining.

47. The method according to claim 42 further comprising a step of receiving the packet from the memory device into a destination port determined to be unavailable during the step of determining after the destination port becomes available.

48. The method according to claim 47 further comprising a step of transmitting the packet performed while the packet is being received from the memory device by the destination port determined to be unavailable during the step of determining.

* * * * *

UNITED STATES PATENT AND TRADEMARK OFFICE
CERTIFICATE OF CORRECTION

PATENT NO. : 6,442,168 B1
DATED : August 27, 2002
INVENTOR(S) : Suresh L. Vasa

It is certified that error appears in the above-identified patent and that said Letters Patent is hereby corrected as shown below:

Title page,
Item [56], U.S. PATENT DOCUMENTS, add the following:

| | | | |
|---|---|---|---|
| -- 5,404,459 | 04/04/1995 | Gulick et al. | 395/275; |
| 5,432,511 | 07/11/1995 | Sadjadian et al. | 341/61; |
| 5,442,578 | 08/15/1995 | Hattori | 364/746.1; |
| 5,565,929 | 10/15/1996 | Tanaka | 348/565; |
| 5,568,643 | 10/22/1996 | Tanaka | 395/739; |
| 5,570,330 | 10/29/1996 | Okawa | 369/44.32; |
| 5,570,466 | 10/29/1996 | Oechsle | 395/200.15; |
| 5,598,161 | 01/28/1997 | Yamada | 341/159; |
| 5,600,664 | 02/04/1997 | Hayashi | 371/43; |
| 5,602,851 | 02/11/1997 | Terashita et al. | 370/403; |
| 5,621,725 | 04/15/1997 | Kawamura et al. | 370/43; |
| 5,623,645 | 04/22/1997 | Yip et al. | 395/551; |
| 5,649,175 | 07/15/1997 | Kanekal et al. | 395/551; |
| 5,761,435 | 06/02/1998 | Fukuda et al. | 395/200.68; |
| 6,247,102 B1 | 06/12/2001 | Chin et al. | 711/150; |
| 6,308,218 B1 | 10/23/2001 | Vasa | 709/238 -- |

Column 1,
Line 38, delete "29–44,such" and insert -- 29–44, such --.

Column 2,
Line 34, delete "packet. The high speed communication bus includes single" and insert -- packet.
　　　　　The high speed communication bus includes single --.

UNITED STATES PATENT AND TRADEMARK OFFICE
CERTIFICATE OF CORRECTION

PATENT NO. : 6,442,168 B1
DATED : August 27, 2002
INVENTOR(S) : Suresh L. Vasa

It is certified that error appears in the above-identified patent and that said Letters Patent is hereby corrected as shown below:

<u>Column 4,</u>
Line 19, delete "764,895" and insert -- 5,764,895 --.
Line 30, delete "884,040" and insert -- 5,884,040 --.
Line 38, delete "104"108" and insert -- 104–108 --.

<u>Column 6,</u>
Line 39, delete "invention. FIG.5 illustrates a block schematic diagram of" and insert -- invention.
         FIG. 5 illustrates a block schematic diagram of --.

Signed and Sealed this

Seventeenth Day of June, 2003

JAMES E. ROGAN
*Director of the United States Patent and Trademark Office*